US007950571B2

(12) United States Patent
Kübler et al.

(10) Patent No.: US 7,950,571 B2
(45) Date of Patent: May 31, 2011

(54) ELECTRONIC BOARDING PASS

(75) Inventors: Anette Kübler, Markt Schwaben (DE); Willfried Wienholt, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 974 days.

(21) Appl. No.: 11/772,454

(22) Filed: Jul. 2, 2007

(65) Prior Publication Data

US 2009/0008439 A1 Jan. 8, 2009

(51) Int. Cl.
*G06F 17/00* (2006.01)

(52) U.S. Cl. ........................................ 235/375; 235/384

(58) Field of Classification Search .................. 235/375, 235/384; 340/825.49
See application file for complete search history.

(56) References Cited

U.S. PATENT DOCUMENTS

2004/0051644 A1* 3/2004 Tamayama et al. ........ 340/686.1
2004/0169589 A1* 9/2004 Lea et al. ................. 340/825.49
2006/0116965 A1* 6/2006 Kudo et al. ..................... 705/52
2006/0279422 A1* 12/2006 Sweatte ................... 340/539.13
2007/0290879 A1* 12/2007 Tuttle ....................... 340/825.49
2008/0128505 A1* 6/2008 Challa et al. ............. 235/462.13

* cited by examiner

*Primary Examiner* — Ahshik Kim
(74) *Attorney, Agent, or Firm* — Young & Thompson

(57) ABSTRACT

The invention relates to an electronic boarding pass for a passenger having an user interface for indicating an actual position of the passenger in an airport. The position data is received via wireless interface of the electronic boarding pass. In a memory flight data and shopping data of the respective passenger is stored. A processing unit such as a microprocessor is provided for processing received position data, data stored in the memory and airport map data of the airport.

16 Claims, 5 Drawing Sheets

ELECTRONIC BOARDING PASS

TECHNICAL BACKGROUND

A boarding pass is a document provided by airlines during a check-in. A boarding pass gives the passengers the authority to board an aircraft of the airline. The boarding pass identifies the passengers and indicates a flight number as well as the date and the scheduled time for departure and its updates.

The boarding pass or portions of the boarding pass are typically collected by gate agents for a cross-check of passenger accounts. For connecting flights a boarding pass is needed for each airplane boarded by the passenger. Some airports and airlines have automatic readers that verify the validity of the boarding pass at the gate door. These automatic readers also automatically update an airline data base that shows all passengers which have boarded the airplane. In most airports the passenger has also to show his boarding pass for shopping in the airport.

For boarding an airplane a passenger has to perform a check-in in a public area of the airport and then pass a security check to enter a security area of the airport. Then the passenger has to reach a gate at a predetermined boarding time printed on the boarding pass. The airport has normally different facilities, such as restaurants, toilets and shops. Because of the increasing time needed for security checks it is quite difficult for a passenger to plan his exact arrival at the gate of his flight. For example it is quite difficult for a passenger to buy different products at shops of the airport within the public or security area because he cannot plan exactly how long it takes to reach the shops and still reach the gate in due time. Accordingly, a passenger often visits the facilities of the airport under severe time pressure.

Accordingly, it is an object of the invention to provide an apparatus and a method for allowing the passenger to plan his arrival time at the gate accurately.

SUMMARY OF THE INVENTION

The invention provides an electronic boarding pass for passengers comprising a user interface indicating an actual position of the passenger in an airport.

In an embodiment of the electronic boarding pass according to the present invention the electronic boarding pass comprises a wireless interface for receiving position data.

In an embodiment of the electronic boarding according to the present invention the electronic boarding pass the wireless interface is an UMTS-interface, a GRS-interface, a GSM/EDGE-interface, an UMTS-interface, a WLAN-interface or a WIMAX-interface.

In an embodiment of the electronic boarding pass according to the present invention the electronic boarding pass comprises a memory for storing flight data and its updates.

In an embodiment of the electronic boarding pass according to the present invention the memory further stores user data of the passenger.

In an embodiment of the electronic boarding pass according to the present invention the user data comprises a passport ID-number and biometric data of the passenger.

In an embodiment of the electronic boarding pass according to the present invention the memory shows shopping data comprising information about purchases performed by the passenger in the airport.

In an embodiment of the electronic boarding pass according to the present invention the memory further stores airline data.

In an embodiment of the electronic boarding pass according to the present invention the user interface further indicates waiting times, an estimated walking time, a gate number, a terminal number, a flight number, a flight operator code, a boarding time and a departure time.

In an embodiment of the electronic boarding pass according to the present invention the user interface comprises a display.

In an embodiment of the electronic boarding pass according to the present invention the display indicates an actual position of the passenger on a map of the airport.

In a possible embodiment of the electronic boarding pass according to the present invention the map of the airport is downloaded by the electronic boarding pass via a wireless interface from a server of the airport.

In an embodiment of the electronic boarding pass according to the present invention the airport map comprises icons indicating facilities of the airport.

In an embodiment of the electronic boarding pass according to the present invention the indicated facilities of the airport comprises shops, toilets and restaurants.

In an embodiment of the electronic boarding pass according to the present invention the passenger can select an indicated facility.

In an embodiment of the electronic boarding pass according to the present invention the electronic boarding pass comprises a microprocessor calculating the shortest route between the position of the passenger to the selected facility.

In an embodiment of the electronic boarding pass according to the present invention the electronic boarding pass comprises an interface for receiving an information text from a server of the airport which is displayed by the display.

The invention further provides a method for informing a passenger having an electronic boarding pass about his actual position comprising the steps of:

receiving position data via a wireless interface of the electronic boarding pass and indicating the actual position of the passenger by a user interface of the electronic boarding pass.

The invention further provides a passenger information system, wherein each passenger receives an electronic boarding pass having a user interface for indicating an actual position of the respective passenger in an airport.

The invention further provides an electronic boarding pass for a passenger comprising a wireless interface for receiving position data of the passenger, a memory for storing flight data and user data of the passenger, a processing unit for processing the received position data, the data stored in the memory and airport map data and an user interface for indicating an actual position of the passenger in the airport.

The invention further provides an electronic boarding pass for a passenger comprising an user interface layer for indicating an actual position of the passenger in an airport, a flexible support layer and a printed circuit layer.

In a possible embodiment of the electronic boarding pass the printed circuit layer comprises a wireless interface for receiving position data of the passenger, a memory for storing flight data and user data of the passenger and a processing unit for processing the received position data, stored in the memory and airport map data.

DETAILED DESCRIPTION OF THE FIGURES

Figure 1:
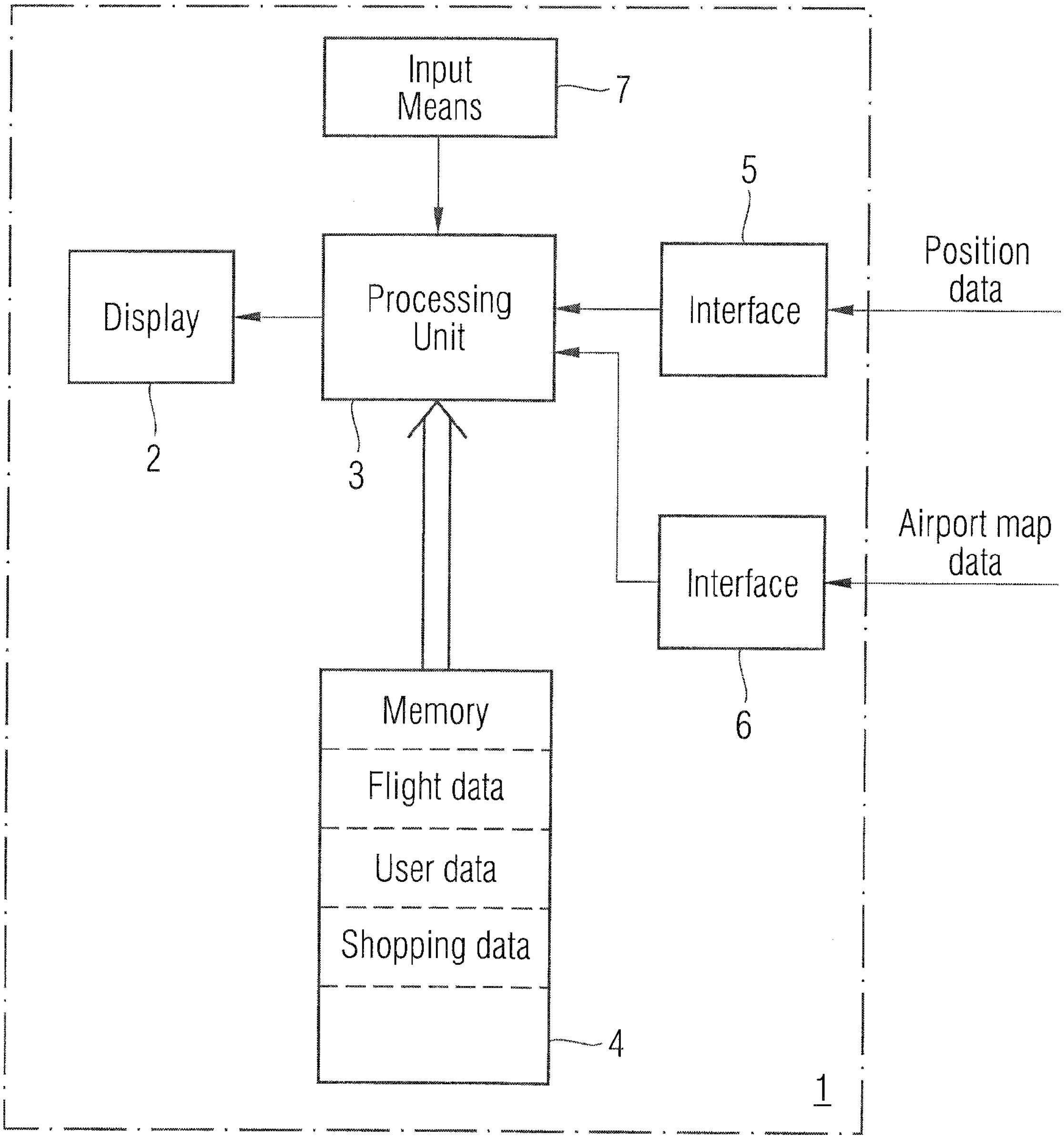
FIG. 1 shows a block diagram of a possible embodiment of the electronic boarding pass according to the present invention.

As can be seen from FIG. 1 the electronic boarding pass 1 according to an embodiment of the present invention comprises an user interface 1. In an embodiment the user interface 2 is formed by a display for indicating an actual position of the passenger in an airport. In an alternative embodiment the user interface is an audio interface informing the passenger about his actual position by means of an audio signal. The electronic boarding pass 1 comprises at least one processing unit 3 for processing data stored in a memory 4 and data received via a first interface 5 and a second interface 6. In a possible embodiment the memory 4 stores flight data, user data and shopping data of the passenger.

In a possible embodiment the first interface 5 is a wireless interface for receiving position data indicating an actual position of the passenger in an airport. This wireless interface 5 is in a possible embodiment a RFID-reader receiving-RFID data from a transmitting unit. In an alternative embodiment the position data is GPS-data. In a still further embodiment the received position data is DECT-data. The wireless interface 5 can be a GPS-, a GSM/EDGE-, an UMTS-, a WLAN- or a WIMAX-interface.

Via a second interface 6 the boarding pass 1 according to an embodiment of the present invention receives airport data from an airport database.

In an embodiment the electronic boarding pass 1 further comprises input means 7 for selecting items shown on the user interface, i.e. display 2. The user data stored in the memory 4 of the electronic boarding pass 1 comprises in a possible embodiment a passport ID-number and biometric data of the passenger. The flight data, which is also stored in the memory 4 comprises for instance the flight number, the gate number, the terminal number, the flight operator, boarding time and departure time of the respective flight. The shopping data stored in the memory 4 comprises information about purchases performed by the passenger in the airport.

Figure 2:
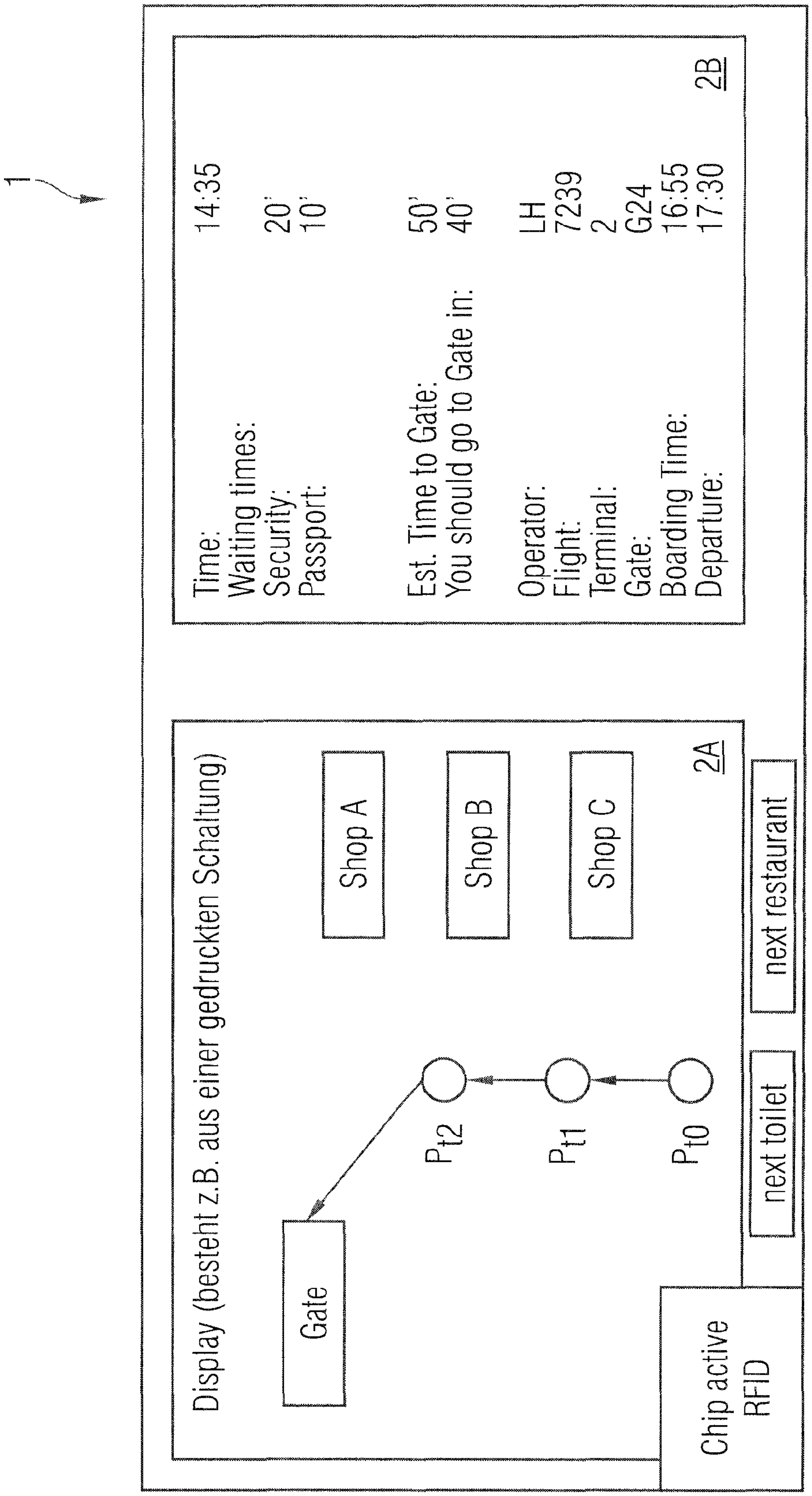
FIG. 2 shows a view on an electronic boarding pass according to a possible embodiment of the electronic boarding pass according to the present invention.

FIG. 2 shows a view of the electronic boarding pass 1 according to a possible embodiment of the present invention. In the given embodiment the electronic boarding pass 1 comprises as an user interface two displays, wherein a first display 2A is provided for indicating the actual position of the passenger in an airport. The second display 2B is provided for displaying data such as flight data or user data. In the given example of FIG. 2 the display 2A of the boarding pass 1 displays different facilities of the airport and the actual position of the passenger P at different times $t_0$, $t_1$, $t_2$. It can be seen from the example of FIG. 2 that the passenger P is moving towards a gate G. On the other display 2B of the electronic boarding pass the passenger can see the estimated walking time to the gate G. In a possible embodiment the estimated time to the gate G includes detected waiting times at the security check. In a possible embodiment the processing unit 3 processes data stored in the memory 4, position data received via the wireless interface 5 and airport map data received via the interface 6. The processing unit 3 calculates in a possible embodiment waiting times for instance at a security check and estimated walking times to the gate G. In a possible embodiment the processing unit 3 is formed by a microprocessor.

In a possible embodiment the microprocessor calculates the shortest route between the actual position of the passenger and a selected facility of the airport. In the example given in FIG. 2 the passenger can for instance select a facility via input means 7 or by pressing a field on the display 2 to select the closest available toilet of the airport. Then the processing unit 3 calculates the shortest route to the toilet and displays the route on the display 2A. The passenger can for instance select the next restaurant or any other facility of the airport.

In a possible embodiment the processing unit 3 further calculates the time when the passenger has to go to his gate G the latest. In the given example of FIG. 2 the passenger is advised to proceed to the gate G in 40 minutes at the latest. In the given example of FIG. 2 the passenger is informed that the estimated waiting time at the security check is 20 minutes and that he has still 40 minutes for example to perform shopping.

In a further embodiment the passenger can input strings of characters into the boarding pass by means of input means 7 to find the right shop for a desired product. The passenger might input a product name such as "clothes" or "perfume" to receive the route to the next shop selling these products.

Figure 3A:
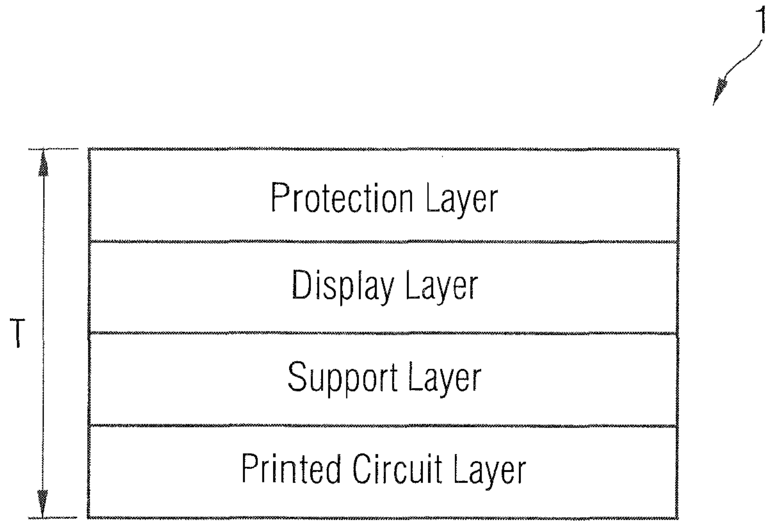
FIG. 3A, 3B, 3C show a sectional view, a view from above and a view from below on a boarding pass according to a possible embodiment of the present invention.
Figure 3B:
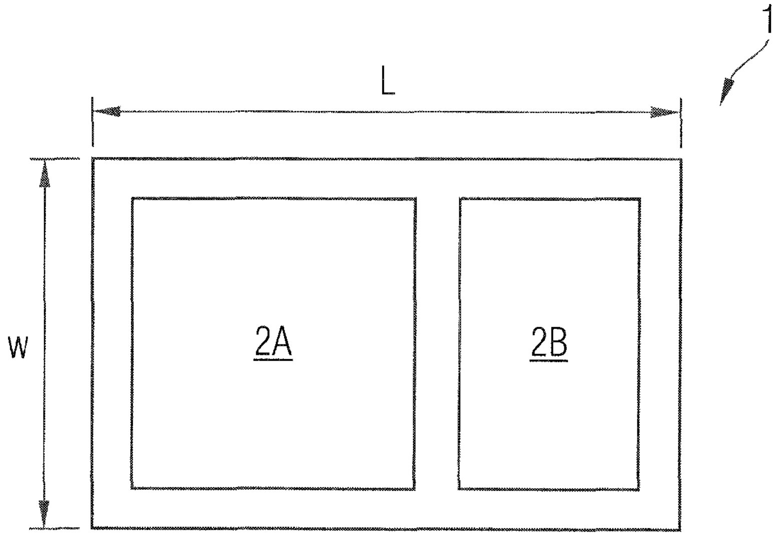

FIG. 3A shows a sectional view of the electronic boarding pass 1 according to one embodiment of the present invention. In the embodiment shown in FIG. 3A the electronic boarding pass 1 comprises a flexible support layer. On the upper side of the support layer an user interface layer such as a display layer is provided which is covered by a protection layer. On the other side of the support layer a printed circuit layer is provider. The printed circuit layer comprises integrated circuits such as the processing unit 3, the memory 4 and the interface circuits 5, 6 shown in FIG. 1. FIG. 3B shows a view on the electronic boarding pass 1 of FIG. 3A from above. In the given example the electronic boarding pass 1 the user interface 2 has two displays 2A, 2B wherein the first display 2A is provided for showing a map and the second display 2B is provided for showing additional data.

Figure 3C:
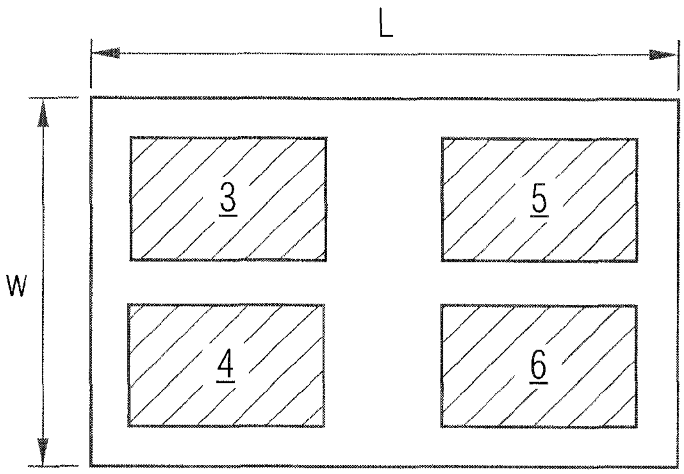

FIG. 3C shows a view on the electronic boarding pass 1 of FIG. 3A from below. The printed circuit layer comprises a processing unit 3, the memory 4 and interfaces 5, 6. In an embodiment of the electronic boarding pass 1 according to the present invention the format, i.e. the length L and the width W of the electronic boarding pass 1 corresponds to the format of a conventional printed boarding pass. Further the thickness T of the electronic boarding pass 1 shown in FIG. 3A corresponds in an embodiment to the thickness of a conventional paper boarding pass.

Figure 4A:
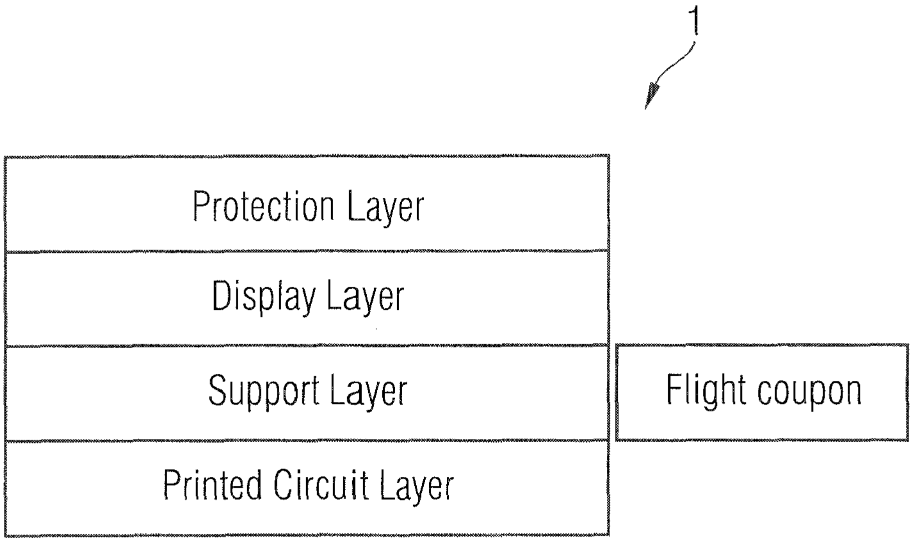
FIG. 4A, 4B show a sectional view and a perspective view of the electronic boarding pass according to a further embodiment of the boarding pass according to the present invention.
Figure 4B:
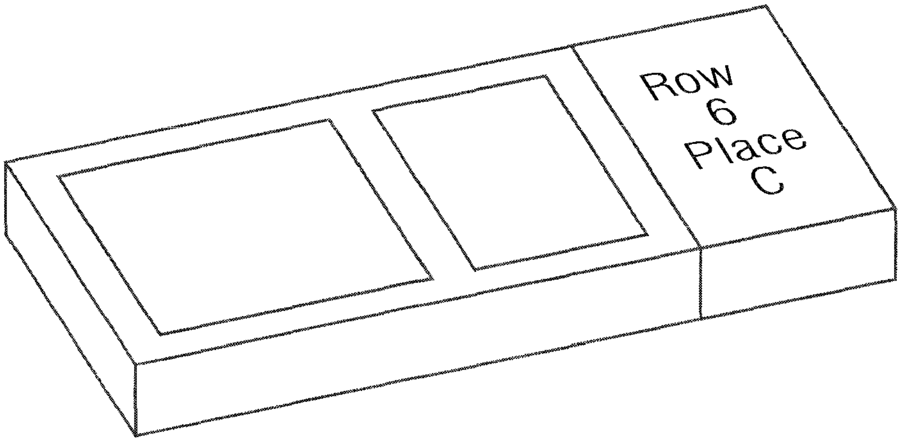

FIGS. 4A, 4B show a further embodiment of the electronic boarding pass 1 according to the present invention. In this embodiment the electronic boarding pass 1 further comprises a flight coupon attached to the support layer that might be detached from the electronic boarding pass 1 at the gate G by an agent and given to the passenger for finding his place within the airplane.

In a possible embodiment a reading unit at the gate G for reading data from the electronic boarding pass 1 can process both a conventional paper boarding pass and the electronic boarding pass 1 according to the present invention.

Figure 5:
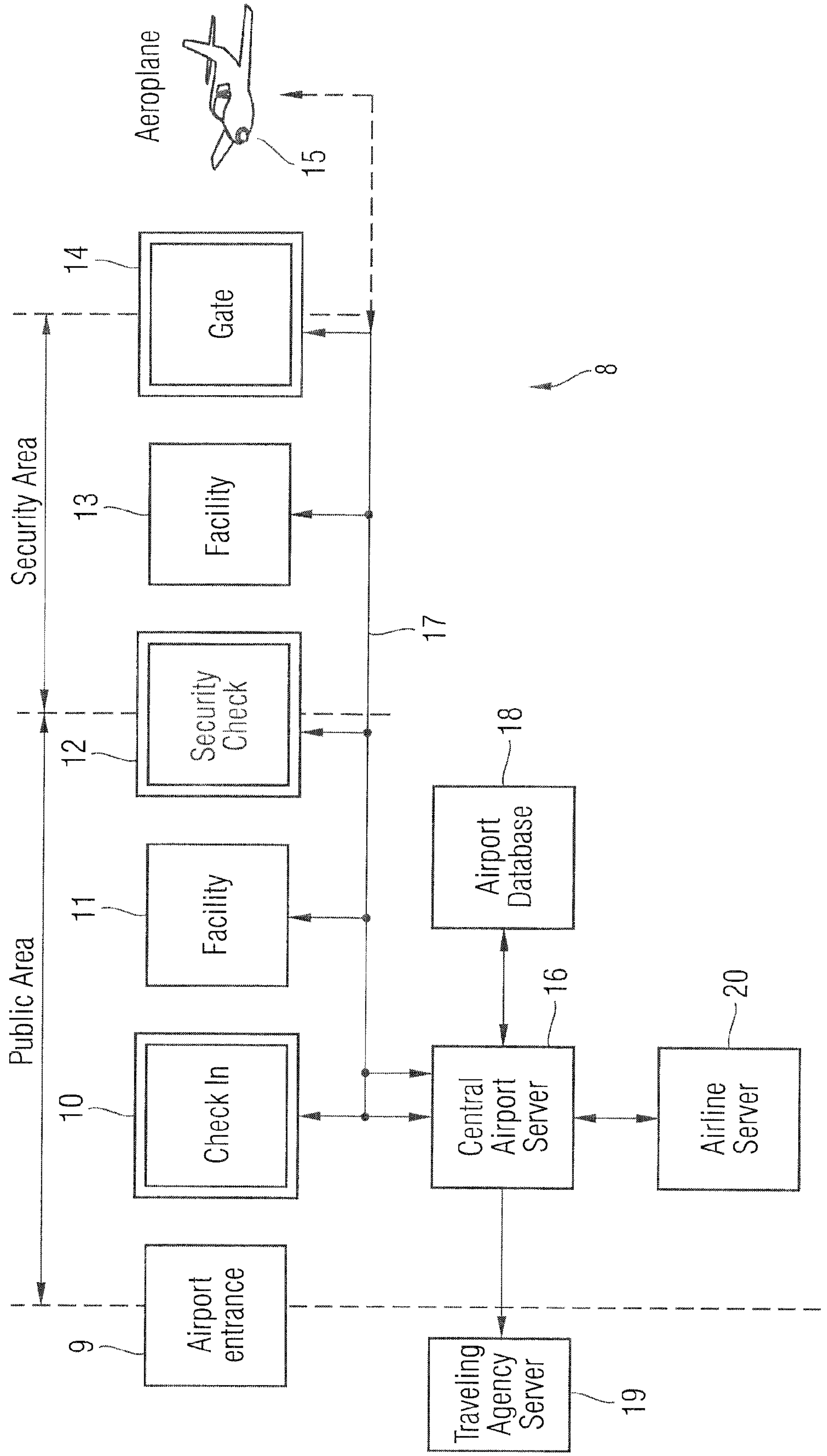
FIG. 5 shows a block diagram of an embodiment of an passenger information system according the present invention.

FIG. 5 shows a block diagram of a passenger information system according to an embodiment of the present invention. The airport 8 as shown in FIG. 5 comprises an airport entrance 9, a check-in 10, facilities 11 in the public area and a security check 12 separating the public area of the airport from the security area. Furthermore, in the airport 8 shown in FIG. 5 facilities 13 are also provided in the security area as well as a gate 14. Through the gate 14 a passenger can reach an airplane 15. A central airport server 16 is connected via a bus 17 to the check-in 10, the facilities 11, 13, the security check 12 and the gate 14. Via a wireless interface the central airport server 16 can also be connected to a system within the airplane 15. In the embodiment shown in FIG. 5 the central airport server 16 is further connected to a airport data base 18. Furthermore, central airport server 16 can be connected to servers 19 of travel agencies and to servers 20 of different airlines.

Via the passenger information system shown in FIG. 5 the passenger can receive an electronic boarding pass 1 at a check-in 10 or already at a travel agency. After entering the entrance 9 the passenger can take his electronic boarding pass 1 and see his actual position in the airport 8. The actual position might be displayed on a display 2A as shown in FIG. 2. Default facilities or facilities selected by the passenger are also displayed on the display 2A. The electronic boarding pass 1 receives the actual position data via a wireless interface 5 as shown in FIG. 1. Airport map data can be downloaded via the same or another interface 6 from the central airport server 16 which is connected to the airport data base 18 storing inter alia airport map data.

In a possible embodiment flight data and user data is stored, e.g. read form a database, in the memory 4 of the electronic boarding pass 1 at a check-in desk 10. In a further possible embodiment the memory 4 further stores baggage data of the passenger. In a possible embodiment the shopping data stored in the memory 4 of the electronic boarding pass 1 is updated in all shops where the passenger buys a product or receives a service.

In a further possible embodiment of the electronic boarding pass 1 according to the present invention the electronic boarding pass 1 receives an information text from the central airport server 16 which is displayed on the display 2. For instance a passenger who expected at a gate 14 and does not show up might receive a warning text message indicating that he shall proceed to his gate 14 as fast as he can.

In a possible embodiment the passenger who has received his electronic boarding pass 1 at the check-in 10 or at his travel agency will give the electronic boarding pass 1 at the gate 14 to an agent of the airline. At the gate 14 a plurality of electronic boarding passes is collected for further evaluation by the central airport server 16. In a further embodiment the shopping data on the collected boarding passes 1 are also evaluated to improve services of the airport. The electronic boarding pass 1 according to the present invention offers the passenger the advantage that he can plan his time at the airport more accurately so that he has more time to stay at a restaurant or to buy products.

An airline having an airline server 20 connected to the central airport server 16 has the possibility to evaluate travelling habits of the passengers to improve its service. The actual position of a passenger is detected and evaluated. The passenger can be informed so that he can reach the gate in due time. The electronic boarding pass 1 according to the present invention increases the convenience of the passenger. He can find his way around at an unknown airport without stress and is warned about delays at the security check to reach his gate safely.

In a further embodiment of the passenger information system according to the present invention the passenger receives the electronic boarding pass 1 at the check-in 10 and keeps the electronic boarding pass until he exits the destination airport.

In a possible embodiment the infrastructure of the airport works both with a conventional boarding pass and with the electronic boarding pass 1 according to the present invention. The passenger is provided with the electronic boarding pass 1 with any useful information such as waiting times, an estimated walking time to a gate, a terminal number, a flight number, a flight operator code, a boarding time, a departure time, shopping information, baggage information such as waiting times at baggage belts etc. In a possible embodiment an electronic boarding pass 1 according to the present invention can be used for more than one flight, in particular for several connecting flights. In this embodiment the passenger receives an electronic boarding 1 at the starting airport and keeps the electronic boarding pass 1 until he reaches destination airport.

An advantage of the passenger information system according to the present invention resides in that each passenger can be informed individually at a central airport server 16. Accordingly, it is not longer necessary to call out a late passenger via loudspeakers at the airport thus reducing noise. Furthermore, each passenger can be informed individually about delays of flights or changes of gates which are relevant for him. In a possible embodiment an airline server 20 of an airline is connected to the central airport server 16 and can detect at an early stage that a flight is overbooked. For instance when the number of passengers which have passed the security check exceeds the capacity of the respective airplane the corresponding airline knows at an early stage that the flight is overbooked and can in a possible embodiment send an offer to passengers to get another ticket and a corresponding financial compensation.

In a possible embodiment the electronic pass 1 stores also biometric data of each passenger so that the security can be enhanced.

After evaluation of the data stored on the collected electronic boarding pass 1 personal data might be deleted.

The invention claimed is:

1. An electronic boarding pass for a passenger comprising a user interface for indicating an actual position of said passenger in an airport, the user interface comprises a display, the display indicates an actual position of the passenger in a map of the airport, the map of said airport is downloaded by the electronic boarding pass via a wireless interface from a server of said airport, the airport map comprises icons indicating facilities of said airport, the facilities of the airport comprises shops, toilets and restaurants, and the passenger can select an indicated facility.

2. The electronic boarding pass according to claim 1, wherein the electronic boarding pass comprises a wireless interface for receiving position data.

3. The electronic boarding pass according to claim 2, wherein the wireless interface is an RFID-interface, a GPS-interface, a GSM/EDGE-interface, a WLAN-interface or a WIMAX-interface.

4. The electronic boarding pass according to claim 1, wherein the electronic boarding pass comprises a memory for storing flight data and its updates.

5. The electronic boarding pass according to claim 4, wherein the memory further stores user data of said passenger.

6. The electronic boarding pass according to claim 5, wherein the user data comprises a passport ID-number and biometric data.

7. The electronic boarding pass according to claim 4, wherein the memory further stores shopping data comprising information about purchases performed by the passenger in the airport.

8. The electronic boarding pass according to claim 4, wherein the memory further stores airline data.

9. The electronic boarding pass according to claim 1, wherein the user interface further indicates waiting times, an estimated walking time to a gate, a gate number, a terminal number, a flight number, a flight operator code, a boarding time, and a departure time.

10. The electronic boarding pass according to claim 1, wherein the electronic boarding pass comprises a microprocessor for calculating the shortest route between the actual position of the passenger to the selected facility of the airport.

11. The electronic boarding pass according to claim 1, wherein the electronic boarding pass comprises an interface for receiving information text from a server of said airport which are displayed by said display.

12. An electronic boarding pass for a passenger comprising:

(a) a wireless interface for receiving position data of said passenger;

(b) a memory for storing flight data and user data of the passenger;

(c) a processing unit for processing the received position data, the data stored in the memory and airport map data; and (d) an user interface for indicating an actual position of said passenger in an airport, wherein, the user interface comprises a display, the display indicates an actual position of the passenger in a map of the airport, the map of said airport is downloaded by the electronic boarding pass via the wireless interface from a server of said airport, the airport map comprises icons indicating facilities of said airport, the facilities of the airport comprises shops, toilets and restaurants, and the passenger can select an indicated facility.

13. A method for informing a passenger having an electronic boarding pass about its actual position comprising the steps of:

(a) receiving position data via a wireless interface of said electronic boarding pass; and (b) indicating the actual position of the passenger by an user interface of said electronic boarding pass, wherein, the user interface comprises a display, the display indicates an actual position of the passenger in a map of the airport, the map of said airport is downloaded by the electronic boarding pass via the wireless interface from a server of said airport, the airport map comprises icons indicating facilities of said airport, the facilities of the airport comprises shops, toilets and restaurants, and the passenger can select an indicated facility.

14. A passenger information system, wherein each passenger receives a corresponding electronic boarding pass having a user interface for indicating an actual position of the respective passenger in an airport, wherein, the user interface comprises a display, the display indicates an actual position of the passenger in a map of the airport, the map of said airport is downloaded by the electronic boarding pass via the wireless interface from a server of said airport, the airport map comprises icons indicating facilities of said airport, the facilities of the airport comprises shops, toilets and restaurants, and the passenger can select an indicated facility.

15. The electronic boarding pass for a passenger comprising a user interface layer for indicating an actual position of said passenger in an airport, a flexible support layer and a printed circuit layer, wherein, the user interface layer comprises a display, the display indicates an actual position of the passenger in a map of the airport, the map of said airport is downloaded by the electronic boarding pass via a wireless interface layer from a server of said airport, the airport map comprises icons indicating facilities of said airport, the facilities of the airport comprises shops, toilets and restaurants, and the passenger can select an indicated facility.

16. The electronic boarding pass according to claim 15, wherein a printed circuit layer comprises a wireless interface receiving position data of said passenger, a memory for storing flight data and user data of the passenger and a processing unit for processing the received position data, the data stored in the memory and airport map data.

* * * * *